(12) United States Patent
Zorgel et al.

(10) Patent No.: US 10,953,846 B2
(45) Date of Patent: Mar. 23, 2021

(54) TENSIONER DEVICE FOR A MOTOR SEAT VEHICLE SEAT BELT WITH A GUIDE ELEMENT

(71) Applicant: AUTOLIV DEVELOPMENT AB, Vargarda (SE)

(72) Inventors: Zoltan Zorgel, Brasov (RO); Imre Paul, Baia Mare (RO)

(73) Assignee: AUTOLIV DEVELOPMENT AB, Vargarda (SE)

( * ) Notice: Subject to any disclaimer, the term of this patent is extended or adjusted under 35 U.S.C. 154(b) by 164 days.

(21) Appl. No.: 16/082,398

(22) PCT Filed: Mar. 8, 2017

(86) PCT No.: PCT/EP2017/055404
§ 371 (c)(1),
(2) Date: Sep. 5, 2018

(87) PCT Pub. No.: WO2017/153453
PCT Pub. Date: Sep. 14, 2017

(65) Prior Publication Data
US 2019/0031134 A1 Jan. 31, 2019

(30) Foreign Application Priority Data
Mar. 8, 2016 (DE) ...................... 10 2016 104 226.9

(51) Int. Cl.
*B60R 22/195* (2006.01)
*B60R 22/18* (2006.01)

(52) U.S. Cl.
CPC .. *B60R 22/1955* (2013.01); *B60R 2022/1818* (2013.01)

(58) Field of Classification Search
CPC .................. B60R 22/1955; B60R 2022/1818
See application file for complete search history.

(56) References Cited

U.S. PATENT DOCUMENTS

| 5,671,949 A | 9/1997 | Bauer et al. |
| 7,976,066 B2 | 7/2011 | Bok et al. |

(Continued)

FOREIGN PATENT DOCUMENTS

| DE | 696 26 094 T2 | 11/2003 |
| DE | 10 2009 039 275 A1 | 3/2010 |

(Continued)

OTHER PUBLICATIONS

Sohnchen et al., Tensioning device with an opening area formed by a material weakening in a seal carrier, Oct. 22, 2015, EPO, DE 10 2014 105 446 A1, Machine Translation of Description (Year: 2015).*

(Continued)

*Primary Examiner* — James A English
(74) *Attorney, Agent, or Firm* — Dickinson Wright PLLC

(57) ABSTRACT

A tensioner device for a seat belt with a tensioner block (1) cable passageway (2) in which there is formed a pressure chamber (3) and a pull cable (4) that can be connected to a compressed-gas powered piston and that can be connected to a seat belt component for providing a tensioning motion. The pull cable extends through the pressure chamber (3) and with a gas generator (5) that is attached to the tensioner block (1), wherein, when triggered, the gas exiting from the gas generator (5) flows through a feed section (6) of the tensioner block (1) into the pressure chamber (3), wherein a guide element (8) is formed in a transition area (7) of the feed section (6) in the pressure chamber (3) that extends via a bar (11) parallel relative to the pull cable (4) and thereby divides the transition area (7) into at least two openings (9).

10 Claims, 2 Drawing Sheets

(56) References Cited

U.S. PATENT DOCUMENTS

| | | |
|---|---|---|
| 8,132,829 B2 | 3/2012 | Sugiyama et al. |
| 2003/0030263 A1* | 2/2003 | Nakano ............... B60R 22/1952 280/806 |
| 2009/0184508 A1* | 7/2009 | Kohama ............. B60R 22/1952 280/806 |
| 2010/0052302 A1* | 3/2010 | Bok .................... B60R 22/1955 280/806 |
| 2010/0090454 A1* | 4/2010 | Sugiyama ........... B60R 22/1955 280/806 |

FOREIGN PATENT DOCUMENTS

| | | |
|---|---|---|
| DE | 10 2009 044 250 A1 | 5/2010 |
| DE | 10 2014 105 446 A1 | 10/2015 |
| EP | 2 082 926 B1 | 2/2011 |

OTHER PUBLICATIONS

International Search Report of PCT/EP2017/055404 dated May 9, 2017.

* cited by examiner

TENSIONER DEVICE FOR A MOTOR VEHICLE SEAT BELT WITH A GUIDE ELEMENT

CROSS-REFERENCE TO RELATED APPLICATIONS

This application is a 35 U.S.C. § 371 national phase application of PCT International Application No. PCT/EP2017/055404, filed Mar. 8, 2017, which claims the benefit of priority under 35 U.S.C. § 119 to German Patent Application No. 10 2016 104 226.9, filed Mar. 8, 2016, the contents of which are incorporated herein by reference in their entirety.

FIELD OF THE INVENTION

The invention relates to a tensioner device for a motor vehicle seat belt (also referred to as a pretensioner device or, more specifically, a linear pretensioner) with a tensioner block that forms a cable passageway, in which there is formed a pressure chamber that follows the cable deflection, and a pull cable that can be connected to a compressed-gas powered piston and that can be connected to a seat belt component that is driven to undergo a tensioning motion. The pull cable enters, the pressure chamber and extends through the pressure chamber and with a gas generator that is attached to the tensioner block, wherein, when triggered, the gas exiting from the gas generator flows through a feed section of the tensioner block into the pressure chamber.

BACKGROUND

A tensioner device with the characteristics as specified above, is generally known in the art from DE 10 2014 105 446 A1 which provides an opening region inside a sealing support to prevent any direct contact of the gas exiting from the gas generator with the pull cable by redirecting the gas at least in part after the gas generator has been triggered. Any direct contact of the gas with the pull cable can weaken the pull cable, which is why the pull cable must be dimensioned accordingly. It is therefore desirable that those tensioner devices that do not include a sealing support as described in DE10 2014 105 446 A1 at least reduce the direct admission of gas that acts on the pull cable.

A further tensioner device is known from DE 10 696 26 094 T2.

SUMMARY AND INTRODUCTORY DESCRIPTION OF THE INVENTION

In view of the foregoing, it is an object of the present invention to provide a tensioner device that offers at least a partial solution for the above-mentioned problems. Specifically, the invention envisions a tensioner device that will weaken the pull cable to a lesser degree during the triggering process.

The above-stated object is achieved with tensioner devices that have the characteristics as specified in the following description.

The above-stated object is addressed by providing a tensioner device where a guide element is implemented in a transition area from the feed section in the pressure chamber for example in the form of a bar, parallel relative to the pull cable, which divides the transition area into at least two openings.

In this solution, when triggered, the bar forms a shadow area relative to the gas, where the pull cable is disposed. Ideally, the bar divides the gas flow that arrives from the feed section in two partial flows, each of which is guided around the pull cable. This means that no major gas flow component will come in direct contact with the pull cable inside the pressure chamber. To advantageously subdivide the flow into two partial flows, it is provided particularly that a width of the bar increases from the feed section to the pressure chamber.

Another solution for the above-mentioned object envisions providing a tensioner device where a guide element is implemented in a transition area from the feed section to the pressure chamber that extends into the transition area and laterally delimits the transition area and that is formed by a deflection area for deflecting the inflowing gas which is directed toward the feed section.

In an embodiment of the invention, a wall extends in the region of the transition area and into the transition area, whereby a flow direction of a substantial part of the gas flow in the feed section is deflected by the protruding wall that forms the guide element, wherefore the deflected part of the gas will not make contact with the pull cable until after an extended flow distance, if at all. While traversing this extended flow distance, the deflected gas can cool down, and accordingly, the weakening effect of the gas on the pull cable is lessened. The deflection area that is directed towards the feed section is therefore configured, particularly, with curved radii that ensure a corresponding deflection.

A solution according to the invention provides that the guide element extends from a side that is directed toward the cable deflection in the direction of extension of the pull cable into the transition area. This means, on the side of the cable passageway, the transition area has a deflection area that is directed toward the feed section and designed such that at least a part of the inflowing gas from the feed section is deflected in the direction of the piston-side end of the pressure chamber. The gas that is deflected in this manner will come into contact with the pull cable in a cooled state, if at all. Moreover, by deflecting the gas, the area of the pull cable where the gas meets the pull cable is enlarged, whereby the weakening influence of the gas is reduced.

A further solution according to the invention provides that the guide element extends from a side that is transverse relative to an extension direction of the pull cable all the way to a cover of the pull cable in the transition area. By such a cover of the pull cable it is intended that at least a part of the inflowing gas is deflected in the circumferential direction around the pull cable. The pull cable is therefore in a shadow area of the guide element that protrudes from one side into the transition area.

The functioning of a tensioner device and of individual components of the tensioner device has been described previously in the introduction in DE 10 2014 105 446 A1 and in EP 2 082 926 B1; we refer to these citations in their entirety. The tensioner device includes, particularly, a tensioner tube for receiving and guiding a compressed-gas powered piston that is connected to the pull cable.

According to an embodiment of the invention, the guide element is designed in one piece with the tensioner block. The guide element is formed already in the production stage of the tensioner block, for example, by means of a zinc die-cast process.

In the alternative, the guide element can be inserted in the tensioner block as an independent component. This way, it is possible to apply the invention to preexisting tensioner blocks.

BRIEF DESCRIPTION OF THE DRAWINGS

The invention and the technical background will be explained in an exemplary manner based on the figures below. In the schematic depictions.

DETAILED DESCRIPTION

Figure 1:
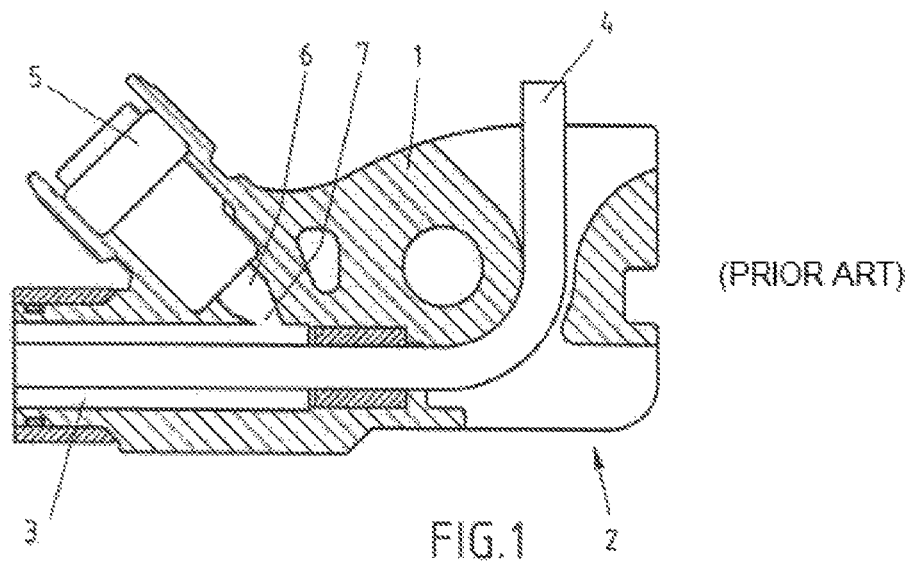
FIG. 1 shows parts of a tensioner device according to the prior art.

FIG. 1 is a longitudinal section of the tensioner block 1 of a tensioner device according to the prior art. On the right side, the tensioner block 1 forms a cable passageway 2 through which extends a pull cable 4. The pull cable 4 is depicted on the right side in FIG. 1 and can be connected to a seat belt component such as a belt latch plate, buckle or anchorage. The pull cable 4 extends to the left through a pressure chamber 3 that is formed inside the tensioner block 1 and connected to a piston on the left side (not shown). In addition, a gas generator 5 is disposed on the tensioner block 1 from which, when triggered, gas flows into a feed section 6 that is formed on the tensioner block 1. In a transition area 7, the feed section 6 transitions into the pressure chamber 6. Although tensioner block 1 forms a cable deflection in the illustrated embodiment, certain implementations can have pull cable 4 extending in a linear manner from pressure chamber 3.

When triggered, the hot gas exits from the gas generator 6 into the feed section 6 and flows through the transition area 7 and into the pressure chamber 3 where it makes direct contact with the pull cable 4. The pull cable 4 may structurally weakened by coming into direct contact with the hot gas. The gas then flows further through the pressure chamber 3 and acts upon the piston that is attached to the pull cable 4 (not shown), whereby the pull cable 4 and accordingly the seat belt component that is connected to the pull cable 4 (not shown) are displaced.

In an embodiment of the present invention a guide element 8 is formed in the transitional area 7 between the feed section 6 and the pressure chamber 3.

Figure 2:
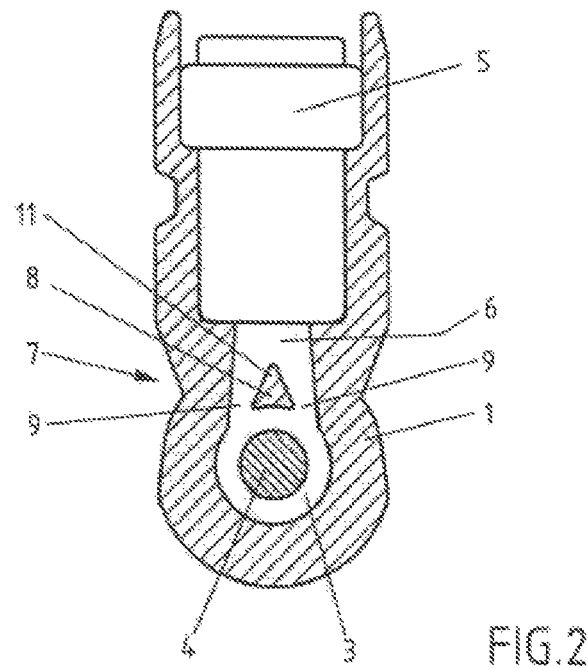
FIG. 2 shows a cross-section of a tensioner device according to the invention.

According to the embodiment in FIG. 2, the guide element 8 is designed as a bar 11 that extends parallel relative to the pull cable 4. The bar 11 creates two openings 9. The bar 11 has an increasing width from the feed section 6 to the pressure chamber 3.

Figure 3:
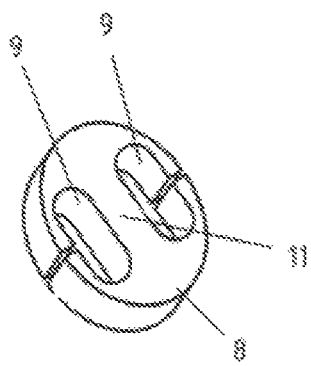
FIG. 3 shows a guide element.

Due to the guide element 8 that is formed via the bar 11, the gas flow that is present in the feed section 6 is subdivided in two partial flows that flow past or around the pull cable 4 in as much as possible and/or do come into contact with the pull cable at a direct large impact angle relative to a normal direction impact). Rather, the pull cable 4 is disposed in the shadow area of the bar 11. This means the bar 11 reduces the possible erosive effect of exposure of the pull cable 4 to direct gas flow from the gas generator 5.

Wherein the bar 11 as shown in FIG. 2 is designed in one piece with the tensioner block 1 (i.e. integrated into the block), FIG. 3 provides, in contrast, that the guide element 8 may be provided as an independent component. The guide element 8 forms a bar 11 that delimits two openings 9. This means that the guide element 8 according to FIG. 3 can be integrated in preexisting tensioner blocks 1 designed in accordance with the prior art.

Figure 4:
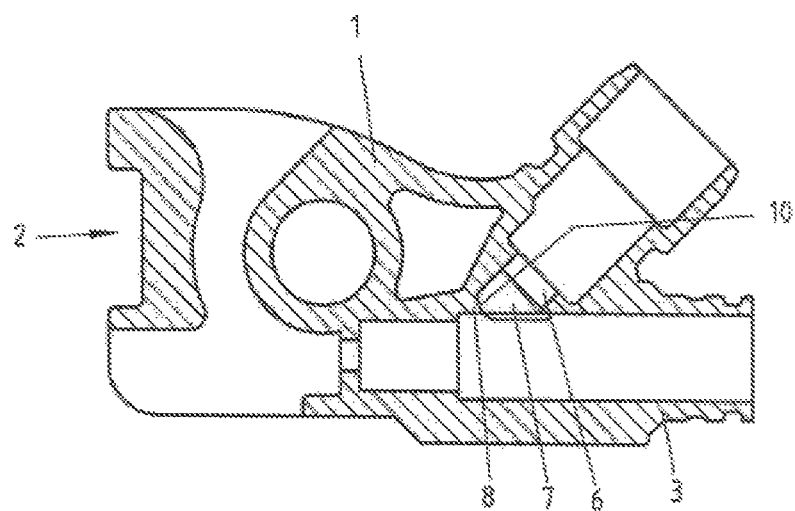
FIG. 4 shows a longitudinal section of the tensioner block.

A further embodiment according to the invention of a tensioner block 1 is depicted in FIG. 4. In the transition area 7, the tensioner block 1 forms a guide element 8 that is directed by a deflection area 10 thereof toward the feed section 6. The guide element 8 delimits the feed section 7 in the direction of the cable guide 2 that is formed on the tensioner block 1. The guide element 8 is designed in such a way in deflection area 10 thereof that at least a part of the gas that arrives from the feed section 6 is deflected to the right (according to FIG. 4). By deflecting the gas, the flow distance after which the gas meets the pull cable 4 is increased, seen in FIG. 4. Along this flow distance, the gas can continue to cool down, thereby reducing the weakening of the pull cable 4.

Although tensioner block 1 forms a cable deflection in the illustrated embodiment, certain implementations can have pull cable 4 extending in a linear manner from pressure chamber 3.

While the above description constitutes the preferred embodiment of the present invention, it will be appreciated that the invention is susceptible to modification, variation and change without departing from the proper scope and fair meaning of the accompanying claims.

The invention claimed is:

1. A tensioner device for a seat belt system for providing a tensioning motion on a seatbelt component and a gas powered piston comprising, a tensioner block that forms a cable passageway in which there is formed a pressure chamber and a pull cable that is connected to the gas powered piston and that is connected to the seat belt component, and the pull cable extends through the pressure chamber; and a gas generator that is attached to the tensioner block, wherein, when triggered, a gas exiting from the gas generator flows through a feed section of the tensioner block into the pressure chamber such that an axis of a gas flow in the feed section is skewed from an axis of the pressure chamber parallel to the pull cable, and wherein a guide element is formed in a transition area by the feed section such that the guide element is formed with a bar parallel relative to the pull cable and thereby subdivides the transition area into at least two openings for guiding the flow of the gas.

2. The tensioner device according to claim 1, wherein a width of the bar increases from the feed section to the pressure chamber.

3. A tensioner device for a seat belt system for providing a tensioning motion on a seat belt component and a gas powered piston comprising, a tensioner block that forms a cable passageway in which there is formed a pressure chamber that follows to a cable deflection and a pull cable that is connected to the gas powered piston and that is connected to the seat belt component, and the pull cable extends through the pressure chamber; and a gas generator that is attached to the tensioner block, wherein, when triggered, a gas exiting from the gas generator flows through a feed section of the tensioner block into the pressure chamber, wherein the feed section is formed to extend laterally outwardly from the pressure chamber such that the feed section extends along an axis of a gas flow skewed from an axis of the pressure chamber parallel to the pull cable, wherein a guide element is formed in a transition area extending from the feed section along the skewed axis from the axis of the pressure chamber and laterally delimits the transition area, and the guide element is formed with a deflection area that is directed toward the feed section for deflecting the inflowing gas such that the deflection area formed with the guide element is arranged in the laterally and outwardly extended feed section along the skewed axis from the axis of the pressure chamber, and wherein the guide element extends from a side that is directed toward the cable passageway in the direction of extension of the pull cable into the transition area.

4. A tensioner device for a seat belt system for providing a tensioning motion on a seatbelt component comprising and a gas powered piston comprising, a tensioner block that forms a cable passageway in which there is formed a pressure chamber that follows the cable passageway and a pull cable that is connected to the gas powered piston and that is connected to the seat belt component and the pull cable extends through the pressure chamber; and a gas generator that is attached to the tensioner block, wherein, when triggered, a gas exiting from the gas generator flows through a feed section of the tensioner block into the pressure chamber, wherein the feed section is formed to extend laterally outwardly from the pressure chamber such that the feed section extends along an axis of a gas flow skewed from an axis of the pressure chamber parallel to the pull cable, wherein a guide element is formed in a transition area extending from the feed section along the skewed axis from the axis of the pressure chamber and laterally delimits the transition area, and the guide element is formed with a deflection area that is directed toward the feed section for deflecting the inflowing gas such that the deflection area formed with the guide element is arranged in the laterally and outwardly extended feed section along the skewed axis from the axis of the pressure chamber, and wherein the guide element extends from a transverse side relative to a direction of extension of the pull cable into the transition area, and is formed with a bar parallel to the pull cable and thereby subdivides the transition area into at least two openings for guiding the inflowing gas.

5. The tensioner device according to claim 1, wherein the guide element is formed in one piece with the tensioner block.

6. The tensioner device according to claim 1, wherein the guide element is inserted into the tensioner block as an independent component.

7. The tensioner device according to claim 3, wherein the guide element is formed in one piece with the tensioner block.

8. The tensioner device according to claim 3, wherein the guide element is inserted into the tensioner block as an independent component.

9. The tensioner device according to claim 4, wherein the guide element is formed in one piece with the tensioner block.

10. The tensioner device according to claim 4, wherein the guide element is inserted into the tensioner block as an independent component.

* * * * *